US011950601B2

United States Patent
Jørgensen

(10) Patent No.: US 11,950,601 B2
(45) Date of Patent: Apr. 9, 2024

(54) INLINE CUTTING SYSTEM FOR AN EXTRUDED STRING OF MEAT ANALOGUE PRODUCT, METHOD FOR INLINE CUTTING AN EXTRUDED STRING OF MEAT ANALOGUE PRODUCT AND USE OF SUCH INLINE CUTTING SYSTEM

(71) Applicant: Source Technology ApS, Kolding (DK)

(72) Inventor: Thomas Kniep Jørgensen, Kolding (DK)

(73) Assignee: SOURCE TECHNOLOGY APS, Kolding (DK)

( * ) Notice: Subject to any disclaimer, the term of this patent is extended or adjusted under 35 U.S.C. 154(b) by 1026 days.

(21) Appl. No.: 16/332,417

(22) PCT Filed: Sep. 12, 2017

(86) PCT No.: PCT/DK2017/050286
§ 371 (c)(1),
(2) Date: Mar. 12, 2019

(87) PCT Pub. No.: WO2018/050187
PCT Pub. Date: Mar. 22, 2018

(65) Prior Publication Data
US 2021/0282418 A1    Sep. 16, 2021

(30) Foreign Application Priority Data
Sep. 13, 2016 (DK) .......................... PA 2016 70699

(51) Int. Cl.
A22C 17/00 (2006.01)
A23P 30/20 (2016.01)
(Continued)

(52) U.S. Cl.
CPC .......... *A22C 17/0006* (2013.01); *A23P 30/20* (2016.08); *B26D 1/11* (2013.01); *B26D 1/34* (2013.01); *B26D 2210/02* (2013.01)

(58) Field of Classification Search
CPC ... B26D 7/10; B26D 1/03; B26D 1/11; B26D 1/38; B26D 7/088; B26D 1/34;
(Continued)

(56) References Cited

U.S. PATENT DOCUMENTS 3,090,075 A * 5/1963 Provenzano .......... B29C 48/022
425/308
3,202,084 A * 8/1965 Hale ....................... A23P 30/34
99/485
(Continued)

FOREIGN PATENT DOCUMENTS

FR       2221081 A1    10/1974
FR       2493678 A1     5/1982
(Continued)

*Primary Examiner* — Ghassem Alie
(74) *Attorney, Agent, or Firm* — Cermak Nakajima & McGowan LLP; James Creighton Wray

(57) ABSTRACT

There is described an inline cutting system comprising an extruder having an outlet, an outlet line connected with the extruder outlet. The outlet line comprises a side wall surrounding an internal passage. Cutting means is arranged in connection with the outlet line. The extruder is arranged for continuously producing a meat analogue product and the extruded string of meat analogue product is cut into meat pieces by the cutting means. The cutting means is extending through the side wall of the outlet line and extends inside said internal passage. The cutting means comprises at least one cutting edge which is pointed in a substantial axial direction of the outlet line in order to establish a cutting in the longitudinal direction of the string of meat analogue
(Continued)

product. The extruder and the outlet line forms a closed enclosure upstream of the cutting means.

14 Claims, 5 Drawing Sheets

(51) Int. Cl.
*B26D 1/11* (2006.01)
*B26D 1/34* (2006.01)

(58) Field of Classification Search
CPC ........ B26D 3/16; B26D 1/02; B26D 2210/02; A22C 17/0006; A23P 30/20
USPC ........................................................ 426/573
See application file for complete search history.

(56) References Cited

U.S. PATENT DOCUMENTS

| | | | | |
|---|---|---|---|---|
| 3,307,503 | A * | 3/1967 | Elmer, Jr. ............ | A23G 3/0242 426/516 |
| 3,778,209 | A | 12/1973 | Wallace | |
| 3,828,638 | A * | 8/1974 | Bonney, Jr. ............ | B60S 1/524 83/365 |
| 4,567,051 | A | 1/1986 | Baker | |
| 4,659,580 | A | 4/1987 | Svengren | |
| 4,911,045 | A * | 3/1990 | Mendenhall ............ | B26D 3/24 83/402 |
| 5,046,388 | A * | 9/1991 | Mendenhall ............ | B26D 3/24 83/402 |
| 5,827,561 | A | 10/1998 | Duve | |
| 7,556,487 | B2 * | 7/2009 | Acar ........................ | A23G 4/20 425/327 |
| 2001/0054459 | A1* | 12/2001 | Hostetler ................ | B21C 35/02 75/352 |
| 2005/0092365 | A1* | 5/2005 | Rawes .................... | A23P 30/20 137/233 |
| 2005/0196502 | A1* | 9/2005 | Alexander ............... | B26D 3/28 426/518 |
| 2006/0040028 | A1 | 2/2006 | Larson | |
| 2009/0096126 | A1* | 4/2009 | Baverel ................. | B29C 48/303 264/146 |
| 2010/0260882 | A1* | 10/2010 | Kearns ................... | A23K 50/80 425/209 |
| 2012/0219676 | A1* | 8/2012 | Juravic .................... | B26D 1/15 426/549 |
| 2018/0029247 | A1* | 2/2018 | Jones .................... | B26D 7/0006 |

FOREIGN PATENT DOCUMENTS

| | | |
|---|---|---|
| KR | 101302949 B1 | 9/2013 |
| WO | 9014767 A1 | 12/1990 |
| WO | 2009034399 A1 | 3/2009 |
| WO | 2010042709 A1 | 4/2010 |

* cited by examiner

INLINE CUTTING SYSTEM FOR AN EXTRUDED STRING OF MEAT ANALOGUE PRODUCT, METHOD FOR INLINE CUTTING AN EXTRUDED STRING OF MEAT ANALOGUE PRODUCT AND USE OF SUCH INLINE CUTTING SYSTEM

This application claims the benefit of Danish Application No. PA 2016 70699 filed Sep. 13, 2016 and PCT/DK2017/050286 filed Sep. 12, 2017, International Publication No. WO 2018/050187 A1, which are hereby incorporated by reference in their entirety as if fully set forth herein.

Inline cutting system for an extruded string of meat analogue product, method for inline cutting an extruded string of meat analogue product and use of such inline cutting system

FIELD OF THE INVENTION

The present invention relates to an inline cutting system comprising an extruder having an outlet, an outlet line connected with the extruder outlet, wherein the outlet line comprises a side wall surrounding an internal passage and cutting means arranged in connection with the outlet line, wherein said extruder is arranged for continuously producing a meat analogue product and wherein the extruded string of meat analogue product after leaving the extruder is cut into meat pieces by the cutting means.

Furthermore the invention relates to a method for inline cutting an extruded string of meat analogue product, which method comprises the steps of forwarding an emulsion continuously axially through an extruder having an outlet and through an outlet line connected with the extruder outlet and comprising a side wall surrounding an internal passage, cutting said string of meat analogue product into meat pieces by cutting means after leaving the extruder.

The inline cutting system is used for cutting meat analogue products into meat pieces by the cutting means in a continuous process, where the cutting means is arranged after an extruder and where the extruder and the outlet line forms a closed enclosure upstream of the cutting means.

The extruder comprises a product inlet and a product outlet and a rotor arranged coaxially inside an extruder barrel and said product outlet is connected to the outlet line.

The extruder may furthermore comprise heating means. Such heating means may be understood as means for applying heat to the product produced in the extruder, but it could also be understood as means for regulating the temperature of the product either to a higher or lower temperature. Said heating means may thus be construed as heat applying or heat extracting means or a combination thereof.

A mixing housing can be arranged directly in front of the barrel or even in the inlet end of the barrel. The emulsion—the product—will be mixed here and there may be added ingredients of any kind in this part of the process.

The extruder may also be suitable for other purposes than making a meat analogue product e.g. for making confectionery or any other type of feed- or foodstuff.

The product—e.g. an emulsion—may be supplied to the extruder and pressed into the product inlet by a pump of suitable type, or by a suitable feeding apparatus, and may alternatively be assisted by the rotor comprising scraping means. If the rotor comprises some kind of helical conveyor means and if the rotor is rotated relatively in a forward direction, the product will—at least—be assisted through the extruder.

The expression "meat analogue product" as used in the present application covers a product made from meat, a product made from ingredients not being meat or a combination hereof.

When using meat then it is important that the product after leaving the extruder is cut into pieces which have a more natural and less artificial look compared to the known cutting systems. Accordingly one could say that "analogue" rather means "naturally looking".

When using a product made from ingredients not being meat one could say that the expression is used in a more "traditional" understanding as a meat alternative product which after leaving the extruder is cut into pieces having a natural look as a piece of meat.

BACKGROUND OF THE INVENTION

Before the development of the present invention, it has been known to use various rotating cutters where the product in a process after extrusion are cut and guided onto an open conveyor and to further processing such as e.g. cooling and packaging.

Also a cutting device known as a "dicer" is commonly used. In a dicer the product may be cut into slices and also into dices. This type of machinery is supplied with product into a feed hopper and further into a rotating impeller. The product is thus processes in a rather open process allowing cooling and aeration of the product to take place. Especially aeration is typically unwanted due to hygienic issues.

Also other types of cutting equipment are known. Common to all the known cutting equipment is that it will cut e.g. an extruded product into very uniform shapes. Producing very uniform products may be a specific demand for some types of products. However for other products such as meat analogue products there is a very large demand for non-uniform products. This is especially important as some products may look too "artificial" when cut into very uniform shapes using the known methods and machinery.

The known cutting techniques are used in many applications all over the world where feed- and foodstuffs are produced from a large variety of e.g. proteins and fats and combined into a preferred product having a structure very similar to meat.

The known techniques are used in many applications all over the world with the advantage that feed- and foodstuffs can be produced form a large variety of e.g. proteins and fats and combined into a preferred product having e.g. a structure very similar to meat or other feed- and foodstuff products.

One challenge by using the known technique is that the machinery, such as the cutting means, over time has a tendency to accumulate layers of product that attaches onto the surface of the parts of the cutting means. Such deposits are built up due to the friction in such equipment and heat generated from shear in the cutting means and thus the emulsion attaches onto the heated surfaces. Also the heat contribution from the extruder has an influence on the tendency for the product to attach onto the surface of the conveyor as well as of the barrel.

One drawback is that a time consuming cleaning has to take place on a regular basis, and that the building up of such deposits, no matter what, has at least some damaging influence on the uniformity of the product when it leaves the cutting means as the cutting process is influenced by the deposits on the cutting means.

The cutting system cuts the product into smaller pieces of a suitable size. The size given the product at this stage may be the final size of the product, but it may also be an intermediate size where the product will be processed even more at a later stage. It is a desire that the product could be given the final size in an inline cutting system in order to overcome need of handling and later processing in order to give the product a structure very similar to meat or other feed- and foodstuff products.

OBJECT OF THE INVENTION

The object of this invention is to provide a system comprising cutting means for inline cutting a string of extruded meat analogue product in a closed process and where the at least one cutting means is arranged to cut the product in longitudinal direction of the string in a continuous process after extrusion.

A further object of the invention is to provide a method for cutting an extruded meat analogue product in longitudinal direction of the string, in a closed process and in a continuous manner after extrusion.

A further object is to provide a system and a method for cutting in the transversal direction of the string of meat analogue product at the outlet opening of the outlet line, in a closed process and in a continuous manner after extrusion.

A further object is to provide a system and a method of meat analogue product in which the cutting means is easy to clean.

DESCRIPTION OF THE INVENTION

The object of the invention is obtained with a system mentioned above and being peculiar in that said cutting means are extending through the side wall of the outlet line and extends inside said internal passage, that the cutting means comprises at least one cutting edge which is pointed in a substantial axial direction of the outlet line in order to establish a cutting in the longitudinal direction of the string of meat analogue product and that the extruder and the outlet line forms a closed enclosure upstream of the cutting means.

The method according to the invention is peculiar in that the method further comprises the steps of
  providing a closed enclosure upstream of the cutting means,
  effecting said cutting inside said internal passage as said cutting means is extending through the side wall of the outlet line and
  effecting said cutting in a substantial axial direction of the outlet line in order to establish a cutting in the longitudinal direction of the string of meat analogue product.

The use of the inline cutting system according to the invention for cutting meat analogue products into meat pieces by the cutting means in a continuous process, where the cutting means is arranged after an extruder involves that the extruder and the outlet line forms a closed enclosure upstream of the cutting means.

The longitudinal direction of the string will be orientated in the axial direction of the of the outlet line. At least the outer part of the outlet line close to the opening will be a straight and rigid part. At last this outer part of the outlet line will be of metal, e.g. stainless steel.

Cutting means can be constituted by any type of means and may possibly be a steel wire or a regular knife comprising a blade and an edge as mentioned below.

No matter how the cutting means is constructed the cutting according to the invention is done in an axial manner along the direction of the product flow. This axial cutting is combined with a cutting in the transversal direction in order to cut the string into meat pieces.

The product will typically be produced using a helix shaped rotor and will thus have a flat shape comparable to the shape of a belt, meaning that the product has a band or strap shape—long and wider than thick.

When the product is extruded this shape is created and when the product enters the outlet line a number of these "belts" are compressed and by performing axial cuts of the product in the outlet line the product obtains a more natural and less artificial look compared to the known cutting systems.

The outlet line may have an external and/or internal passage having a cross sectional shape being circular, oval, square, rectangular or any other shape.

The cutting means which extend through an opening in the side wall could go all the way through the side wall and extend through a diametrally opposite opening. However, it is preferred that the cutting means extend through an opening in the side wall and extend through the internal passage to a position immediate vicinity of the inner side of the side wall opposite the opening.

The cutting means effect a cutting in the longitudinal direction of the string which could be orientated through the internal passage in a laminar way or could be forwarded through the internal passage of the outlet line with a screw-like rotation. The cutting action would obtain very natural like surface of the final meat pieces.

Seeing that the cutting is effected in a closed system, a very efficient handling of the product is obtained in which it is possible to control the different parameters. Moreover, there will be no risk of contamination or any need for aligning meat pieces which is the case with a treatment according to prior art.

Moreover, the process is efficient seeing that the cutting is effected continuously in the extruded string of the meat analogue product.

In order to establish meat pieces it might the string parts formed by the cutting in axial direction are also cut into individual lengths with a cutting edge orientated transversal to the outlet line.

When operating the system the cutting edge which establishes the cutting in the transversal direction of the string will be reciprocating movement with a high frequency. Typically the frequency could be more strokes/cuttings per second, e.g. 4-10 strokes/sec. However, it is noted that the frequency of the reciprocating movement of the cutting edge on the transversal cutting is adapted to the flow rate through the outlet line.

According to a further embodiment, the system according to the invention is peculiar in that the cutting means comprises at least one cutting edge which is pointed in a direction substantial perpendicular to the outlet line in order to establish a cutting in the transversal direction of the string of meat analogue product.

It should be observed that the cutting edge described could be arranged with a straight extension or any curved extension. Moreover, the cutting edge could be arranged with an oblique orientation compared to a plane being perpendicular to the axial direction of the outlet line. Likewise the cutting edge could be orientated with an extension in a plane being perpendicular to the axial direction of the rigid pipe.

According to a further embodiment, the system according to the invention is peculiar in that the cutting means is arranged in at least one side opening in the side wall which closely surrounds the cutting means.

When the cutting means are arranged through side openings in the side wall it is possible to retract the cutting means from the position where they are arranged in the internal passage of the outlet line to a position outside or partly outside the side wall. When the side opening which is used for the retraction and reinserting of the cutting means closely surrounds the cutting means it is possible to obtain a scraping effect. Hereby the cutting edge could be cleaned on regular basis.

Retracting and inserting a cutting edge is effected very quickly. A cycle will only take parts of a second in order to obtain an axial cutting which is substantially continuously. When the cutting edge is used in the meat analogue product the deposits which are build up on the cutting edge is automatically removed by the scraping action of the side openings which closely surrounds the cutting means.

Moreover, the closely surrounding opening will ensure that the process would be a closed process. As mentioned above a closed process is important due to hygienic issues, e.g. to obviate aeration of the product.

According to a further embodiment, the system according to the invention is peculiar in that the cutting means is connected with drive means for retracting the cutting means from their position in the internal passage and reinserting the cutting means again whereby a scraping effect is obtained when retracting the cutting means.

As mentioned above drive means are used for the retraction and reinserting of the cutting means. The drive means could have different forms.

It is preferred to use fast acting piston cylinder mechanism which is connected either directly with the cutting means or indirectly through support beams if more cutting means are actuated simultaneously.

The movement of the cutting means or the support beam will be controlled by guide means which ensures a correct linear movement of the cutting means during the retraction and the reinsertion.

According to a further embodiment, the system according to the invention is peculiar in that the cutting means comprises at least one knife set, that each knife comprises a blade and said cutting edge.

A knife is suitable to act as cutting means. A knife would comprise a blade and the cutting edge which effects the cutting of the string. At least one knife set is used. However, more knife sets would normally be used in order to obtain the actually cutting of the string under different angles. When using more knife sets arranged under different angles it is possible to divide the string into any desired number of partial strings. The number of knife sets would be adapted to the diameter of the internal passage and the intended size of the final meat pieces.

According to a further embodiment, the system according to the invention is peculiar in that said at least one knife set comprising two, three or more knife blades arranged in relation to each other e.g. in parallel.

A knife set could comprise two, three or more knife blades arranged parallel. Hereby it is possible with only one actuator or drive mechanism to effect more axial cuttings in different planes having the same angle instead of using more knife set which each comprises only one knife blade with cutting edge.

According to a further embodiment, the system according to the invention is peculiar in that the cutting means comprises at least two sets of cutting edges, that each set of cutting edges is arranged in a plane substantially perpendicular to the outlet line, that said at least two sets of cutting edges are arranged in different positions at the circumference of the outlet line for retraction under different angles.

As mentioned earlier two sets of cutting edges could be arranged under different angles relating to the outlet line. When the cutting edges are arranged at different positions at the circumference the mutual angle between the planes in which the cutting edge acts could be provided by any suitable positioning of the side openings in the side wall of the outlet line. The cutting edges will provide a cutting in the axial direction of the outlet line. By adjustment of the mutual angles of the cutting edges it is possible to obtain the form of the partial string formed by the cutting action.

According to a further embodiment, the system according to the invention is peculiar in that the cutting means comprises at least one further cutting edge which is pointed in a direction substantial perpendicular to the outlet line and being arranged at the outlet opening of the outlet line in order to establish a cutting in the transversal direction of the string of meat analogue product leaving the outlet line.

The further cutting edge arranged at the opening of the outlet line could be used instead of the cutting means providing the transversal cutting of the partial strings effected inside the outlet line. The cutting edge acting at the outlet opening of the outlet line could also be used in combination with a transversal cutting already effected in the outlet line.

The cutting means arranged at the opening of the outlet line could be given different forms and a higher degree of freedom is obtained in the embodiment of such cutting means than it is possible to obtain with cutting means extending through an opening in the side wall in order to establish the cutting in the transversal direction of the string.

According to a further embodiment, the system according to the invention is peculiar in that hat the at least one further cutting edge is a rotating cutting edge rotating around and axis perpendicular to the outlet line.

The further cutting edge at the outlet opening could have a reciprocal movement. However, it is preferred that the cutting edge is a rotating cutting edge which rotates around an axis perpendicular to the outlet line. With such rotation or movement it is possible to adapt the rotational speed and thereby influence the size of the final meat pieces obtained in the cutting. Moreover, the rotation or movement could be used to direct the meat pieces leaving the outlet opening in any desired direction by adjusting the position of the rotation axis for the rotating cutting edge.

According to a further embodiment, the system according to the invention is peculiar in that the at least one further cutting edge cooperates with the edge of the opening of the outlet line which acts as a wearing bar for the cutting edge.

When using the further cutting edge it is possible that the edge of the opening of the outlet line could act as a wearing bar or counter knife for the cutting edge. Hereby it is possible in an efficient way to establish the cutting.

According to a further embodiment, the system according to the invention is peculiar in that the at least one further cutting edge is a shredding edge in order to obtain a shredding rather than a clean cutting.

When a shredding edge is used for the further cutting edge a shredding could be obtained which would give the final meat piece a more natural look.

According to a further embodiment, the system according to the invention is peculiar in that the outlet line comprises a flexible hose which at one end is connected with the extruder outlet and at the other end is connected with a straight rigid pipe at which the cutting means is provided.

The outlet line needs not to be in a single piece. When using a flexible hose connected with the extruder outlet and being connected with a straight rigid pipe it is possible to have a flexible positioning of the cutting means in relation to an extruder.

According to a further embodiment, the system according to the invention is peculiar in that the cutting system comprises two or more outlet lines each of which is connected with an extruder outlet.

When the cutting system comprises to a more outlet lines it is possible to provide all the rigid pipes with the opening of the outlet lines on a common line cooperating with a rotating cutting edge arranged as a single element instead of using more rotating cutting edges which should each have a drive system. Moreover, it is possible to adapt the capacity seeing that one could use a number of the extruders or all of the extruders which are associated with the outlet lines.

According to a further embodiment, the method according to the invention is peculiar in
- providing drive means connected with the cutting means,
- activating the drive means for retracting the cutting means from their position in the internal passage and reinserting the cutting means again thereby obtaining a scraping effect when retracting the cutting means.

As already mentioned the closed process is beneficial and the process should preferably be continuously. By retracting the cutting means and establishing a scraping effect it is possible to obtain a cutting effect seeing that the retraction and reinsertion of the cutting means could be effected with such a speed that the extruder needs not to be stopped during this movement of the cutting means.

According to a further embodiment, the method according to the invention is peculiar in
- providing at least one further cutting edge which is pointed in a direction substantial perpendicular to the outlet line and being arranged at the outlet opening of the outlet line,
- activating said at least one further cutting edge thereby establishing a cutting in the transversal direction of the string of meat analogue product leaving the outlet line.

When the further cutting edge pointed in the direction substantially perpendicular to the outlet line then the further cutting in transversal direction of the string is effected when the meat analogue product leaves the outlet line. Such transversal cutting at the opening of the outlet line gives a freedom for the frequency of the cutting and also the form of the cutting.

According to a further embodiment, the method according to the invention is peculiar in
- that the cutting in the transversal direction of the string of meat analogue product leaving the outlet line is a shredding rather than a clean cutting as the least one further cutting edge is a shredding edge.

When tearing or shredding is effected the final meat pieces will not look artificial and be more like a natural meat product.

The main benefit of all of the above mentioned embodiments is that the process is effected continuously and in a closed system. Therefore, the final string of meat analogue product is cut into the final form of meat pieces without any risk of aeration which is unwanted due to hygienic issues.

Moreover, the continuously working process could easily be adapted as an inline process where the cutting system is coupled directly to the outlet of an extruder.

A further advantage is the possibility to clean the cutting means through a CIP cleaning procedure.

Advantageously, the cutting system could cut the products into the final size of the product in order to obviate the need to process the meat pieces leaving the cutting means at a later stage.

DESCRIPTION OF THE DRAWING

The invention will be described in further detail below by means of non-limiting embodiments with reference to the drawing, in which.

Figure 1:
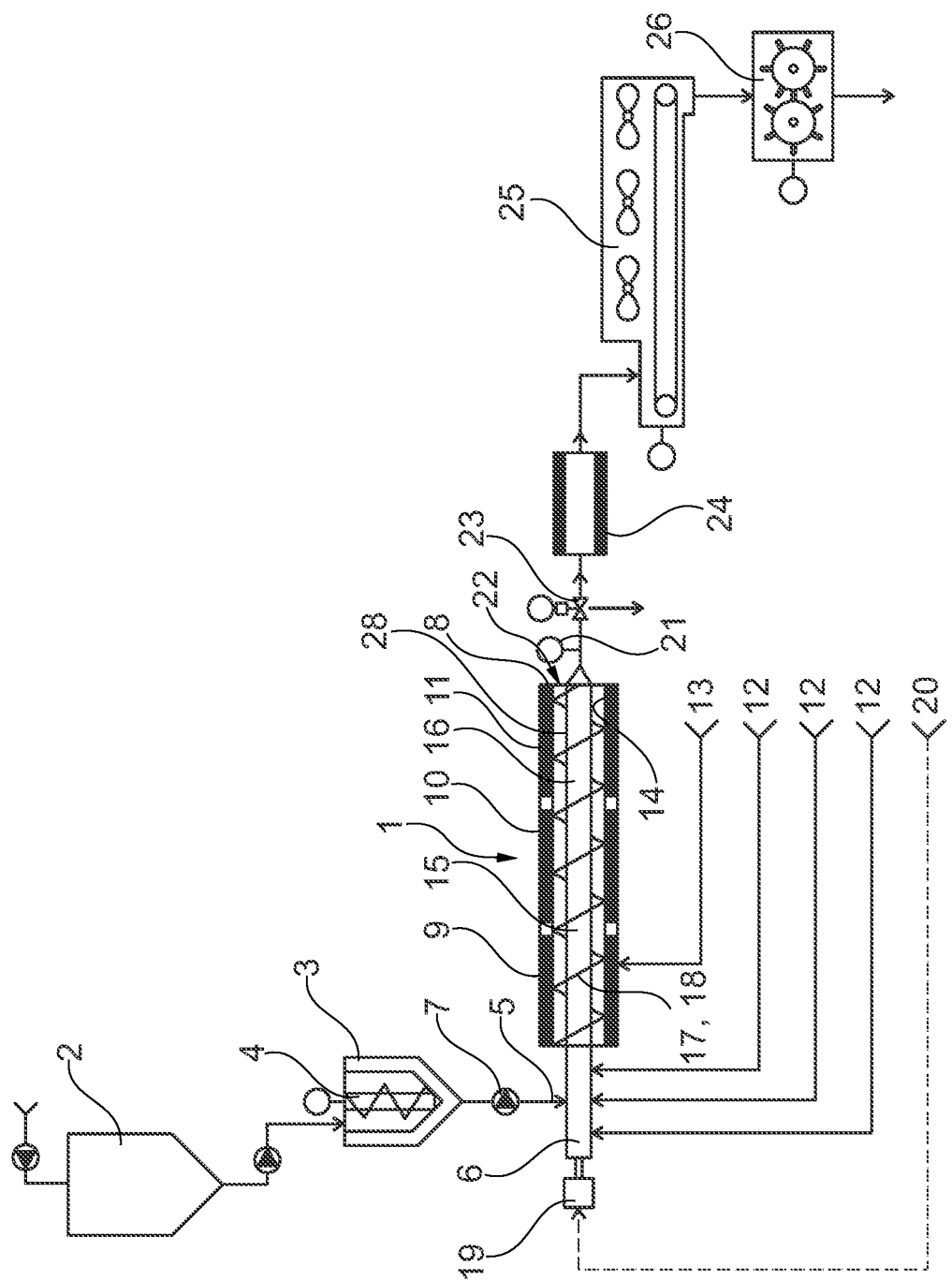
FIG. 1 shows an example of an prior art extruder having further equipment installed in front of and after the extruder.

In the drawing, the following reference numerals have been used for the designations used in the detailed part of the description:

LIST OF POSITION NUMBERS

1 Extruder
2 Pre-bin
3 Pre-heating/mixing tank
4 Stirrer
5 Product inlet
6 Inlet section
7 Pump
8 Barrel
9 First barrel section
10 Second barrel section
11 Third barrel section
12 Inlets in mixing housing
13 Inlets in barrel
14 Inner surface in barrel
15 Centre core
16 Rotor
17 Scraping means
18 Flights
19 Drive means
20 Energy/steam connection to the centre core
21 Sensor
22 Product outlet
23 By-pass valve
24 Grilling section
25 Cooling section
26 Cutting section (prior art)
27 Cutting system
28 Outlet line
29 Flexible hose
30 Rigid pipe
31 First cutting knife set
32 Second cutting knife set
33 Third cutting knife set
34 First actuator 35 Second actuator
36 Third actuator
37 First support beam
38 Second support beam
39 Third support beam
40 First guide means
41 Second guide means
42 Third guide means
43 Side wall
44 Internal passage
45 Axial direction of rigid pipe
46 First side openings
47 Second side openings
48 Third side opening
49 First knife blade
50 First knife edge
51 Second Knife blade
52 Second knife edge
53 Rotating Knife set
54 Axis for rotating knife set
55 Knife blade of rotating knife set
56 Knife edge of rotating knife set
57 Opening of outlet line
58 Edge of opening
59 Direction of rotation

DETAILED DESCRIPTION OF THE INVENTION

FIG. 1 shows an example of a prior art extruder 1 having further equipment installed in front of and after the extruder 1.

In front of the extruder 1, a pre-bin 2 is seen where the emulsion/product is stored and from where the product is led to a pre-heating and/or mixing tank 3. Inside the preheating/mixing tank 3, a stirrer 4 is seen which stirs the added product and ingredients into a homogeneous emulsion or product. The product is led further into an inlet 5 in the extruder 1 via the inlet section 6. On the inlet line a pump 7 is provided for pumping the product through the extruder 1. The inlet section 6 is connected to the barrel 8 of the extruder 1. The barrel 8 is divided into three sections 9, 10, 11 where different conditions may be present in each section 9, 10, 11.

Each section 9, 10, 11, or the barrel 8 in general, may comprise one or more sensors for detection of temperature, pressure or other process parameters that could be attractive to detect.

The inlet section 6 has inlets 12 for e.g. steam, water and oil which are led into the inlet section 6 and into the product. The barrel 8 also has inlets 13 for indirect supply of e.g. steam in order to heat up the inner surface 14 of the barrel 8.

Centrally in the barrel 8, a centre core 15 is seen depicted with a rotor 16 arranged around a stationary centre core 15, where the rotor 16 comprises scraping means 17, in the shape of a helical screw conveyor with flights 18. The rotor 16 is rotated by means of the drive means 19 arranged at the end of the mixing housing 6. The centre core 15 is energised with e.g. steam via a connection 20.

Further down the line of the apparatus seen in FIG. 1, there is arranged a sensor 21 e.g. a temperature and/or pressure sensor at the product outlet 22 and a by-pass valve 23 that allows for a product to be bypassed until e.g. a specific temperature is measured at the sensor 21. Even further down the line, a grilling section 24 is arranged and can be used to apply a desired grill effect on the product before cooling it in a cooling section 25. The product can be led through the grilling section 24 and the cooling section 25 with or without any process taking place and into a cutting section 26, where the product can be cut into pieces of a desired size.

Figure 2:
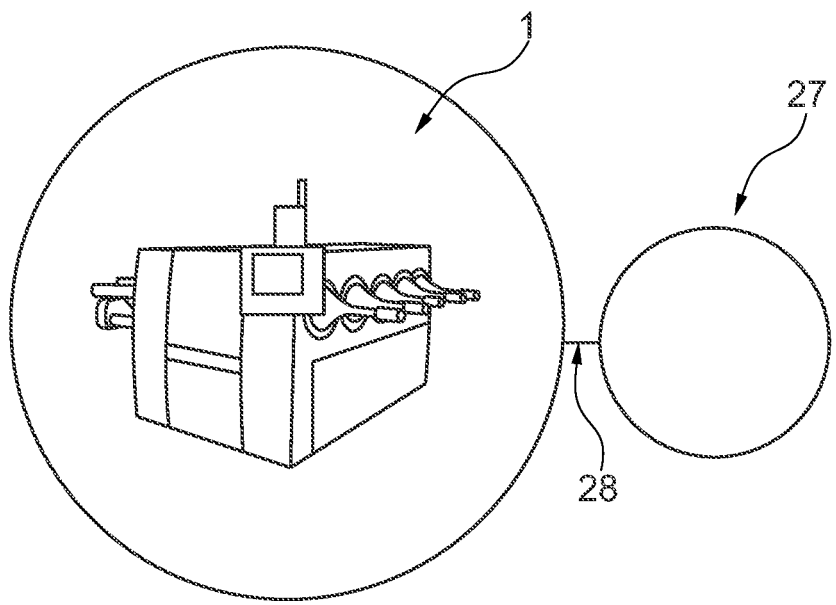
FIG. 2 shows a sketch of the arrangement of the extruder and the in line cutting system according to the present invention.

An inline cutting system 27 according to the present invention may be connected to the product outlet 22 of the extruder 1 through an outlet line 28 illustrated in FIG. 2.

Figure 3:
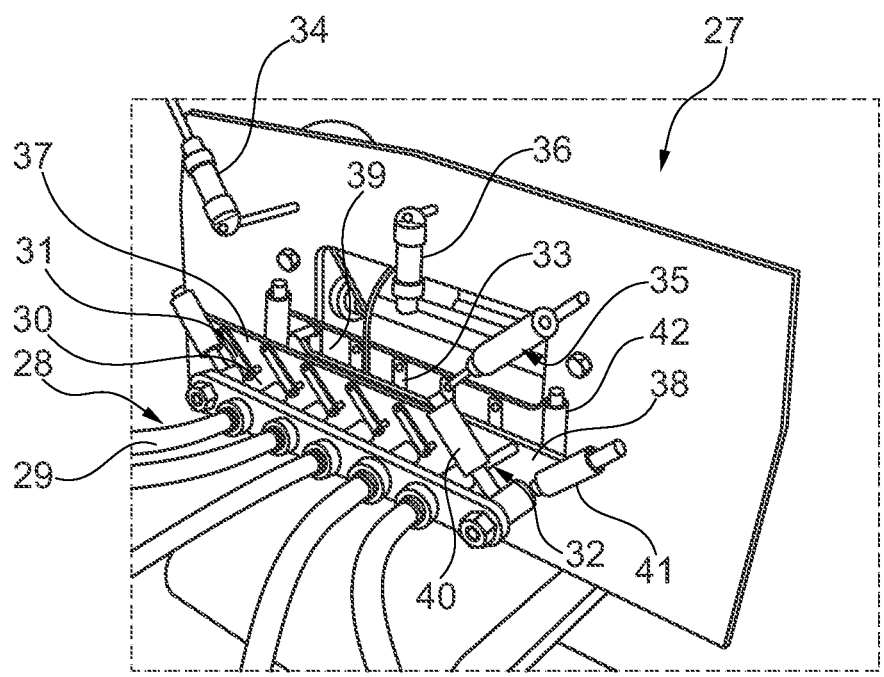
FIG. 3 shows a partial perspective view of an inline cutting system according to the present invention.

FIG. 3 illustrates a cutting system 27 comprising 5 outlet lines 28. Each of the outlet lines 28 is connected with an extruder outlet, which is not illustrated in FIG. 3. Each of the outlet lines 28 comprises a flexible hose 29 which is connected to the product outlet 22 at one end which is not shown in FIG. 3. At the other end the flexible hose 29 is connected with a rigid pipe 30.

Each of the rigid pipes 30 is provided with a first cutting knife set 31 and a second cutting knife set 32. The first and second cutting knife sets constitute cutting means, which comprises a cutting edge which is pointed in a substantial action direction 45 (see FIGS. 4 and 5). In order to establish a cutting in the longitudinal direction of a string (not illustrated) of meat analogue product the string is conducted through the outlet line 28. The orientation of the first and second cutting knife sets 31, 32 occurs more clearly from FIGS. 4 and 5. The first cutting knife set 31 and each of the outlet lines 28 is connected with a first support beam 38. This first support beam is actuated with a first actuator 34 and is guided on first guide means 40.

Each of knife sets of the first cutting knife set 31 and the second cutting knife set 32 comprises a first knife blade 49 having a first knife edge 50. The knife edge 50 establishes a cutting in the longitudinal direction of the string of meat analogue product.

Each of the second cutting knife sets 32 are connected with a common second support beam 38. This second support beam 38 is driven by a second actuator 35 and is guided on second guide means 41. It occurs that the first and second guide means 40, 41 are directed under different angles, having a mutual angle of 90° (which occurs more clearly from FIGS. 4 and 5). Moreover, a third cutting knife set 33 is provided close to the opening 57 of the outlet line. The third knife set 33 is connected with a third support beam 39, which is driven by a third actuator 36 and is guided of a third guide means 42.

The third knife set comprises a second knife blade 51 having a second knife edge 52 extending in a direction substantial perpendicular to the axis 45 of the outlet line. The second knife edge provides a cutting in transversal direction of the string of meat analogue product leaving the outlet line.

As it occurs from FIGS. 4-7 each first cutting knife set comprises two first knife blades 49 being arranged parallel in relation to each other. Each of the first knife blades 49 extends through a first side opening 46 in the side wall 43 in order to enter into the internal passage 44 of the rigid pipe 30.

In the same way each second cutting knife set 32 comprises two first knife blades 49 arranged parallel in relation to each other. Each first knife blade of the second cutting knife set 32 extends through second side openings 49 through the side wall 43 in order to extend into the internal passage 44 of the rigid pipe 30.

The third cutting knife set comprises one second knife blade 51 having a second knife edge 52. The second knife blade extends through a third side opening 48 in the side wall 32 in order to extend into the internal passage 44 of the rigid pipe 30.

Figure 4:
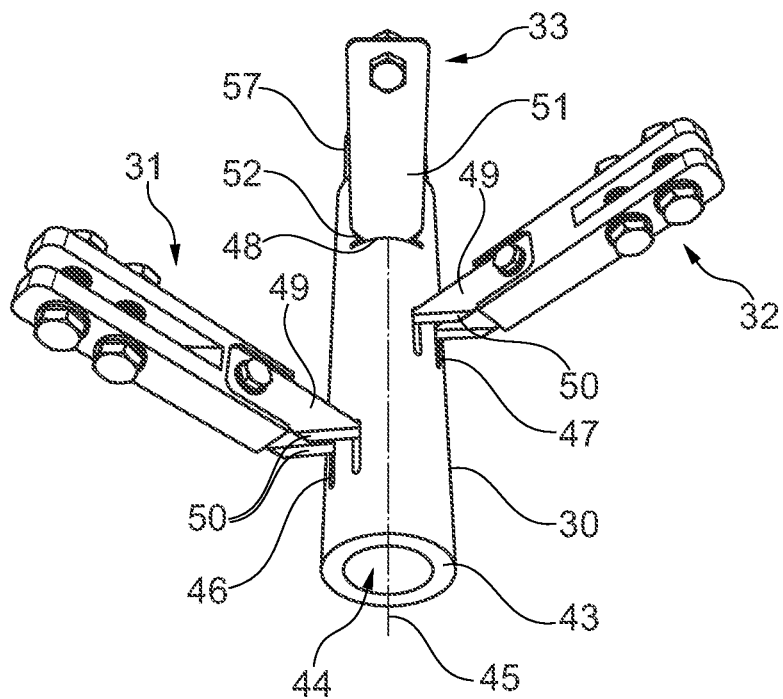
FIG. 4 shows a partial perspective view of an outlet line and cutting means being in a retracted position.
Figure 5:
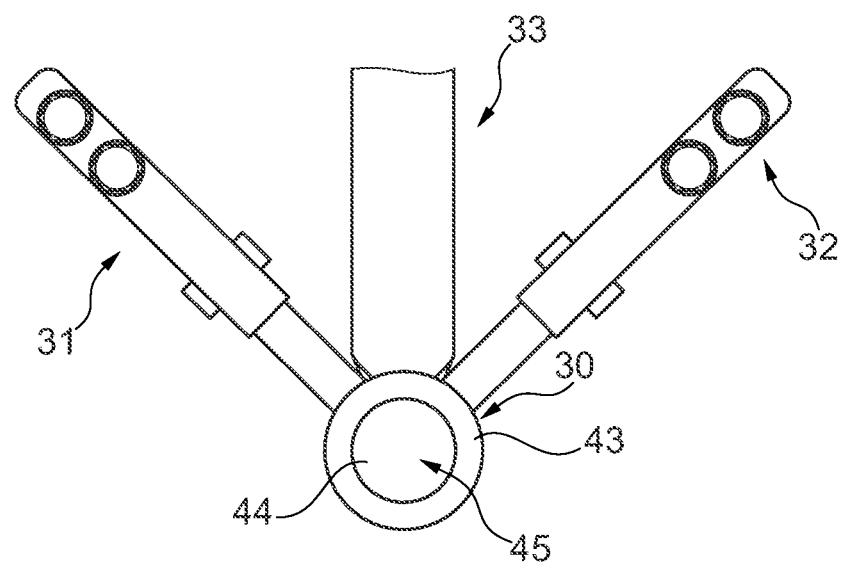
FIG. 5 shows an end view corresponding to FIG. 4.
Figure 6:
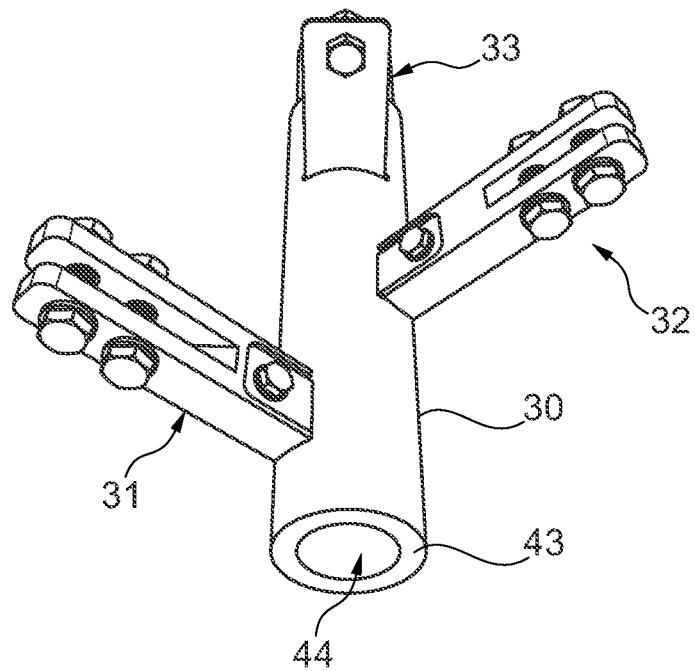
FIG. 6 shows a partial perspective view corresponding to FIG. 4, however with the cutting means being arranged in the internal passage of the outlet line.
Figure 7:
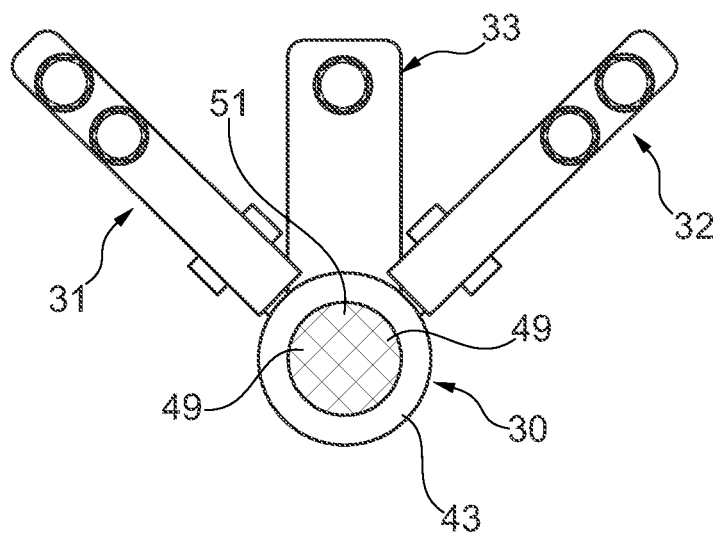
FIG. 7 shows an end view corresponding to FIG. 6

The above mentioned first, second and third cutting knife sets are arranged in order to be retracted from the position in the internal passage as illustrated in FIGS. 6 and 7 to the position outside the side wall 43 illustrated in FIGS. 4 and 5. During the retraction a scraping effect will be effected which cleans the knife blades for any deposits seeing that the side opening 46, 47 closely surrounds the knife blades.

In general the retraction will be effected approximately every second minute. The retraction and reinserting will only take parts of a second.

The second knife blade 51 will be retracted and reinserted through the third side opening 48 very frequently and acts as a guillotine in order to cut the string of meat analogue product into meat pieces. In general the second knife blade will be reciprocated six times per second.

Figure 8:
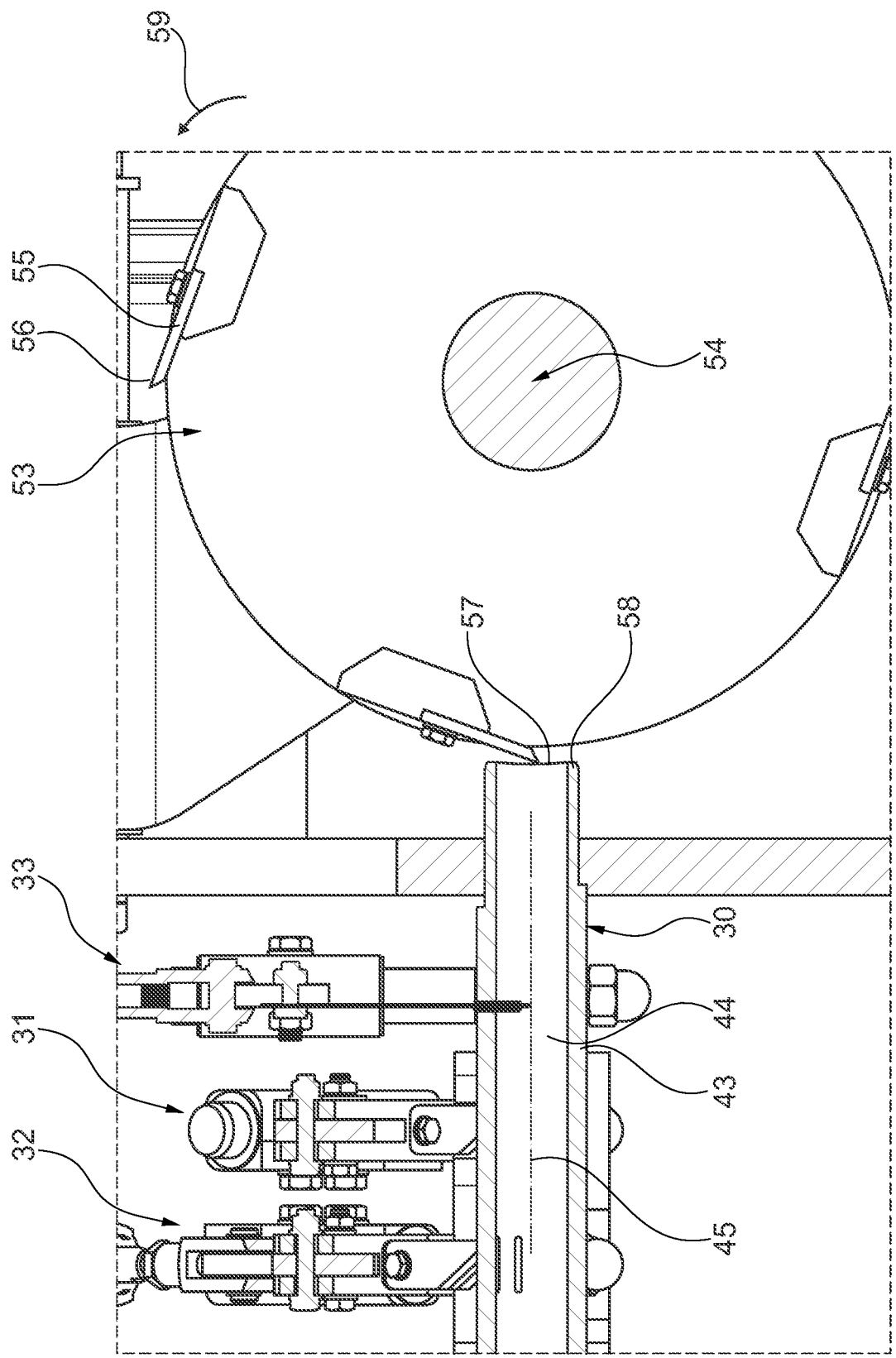
FIG. 8 shows and partial sectional view through the outlet line and illustrating a rotating cutting edge at the opening of the outlet line.

Instead of using the second knife blade to cut the string into meat pieces it is possible to use a rotating knife set 53 illustrated in FIG. 8. The rotating knife set 53 rotates around an axis 54. The rotating knife set 53 comprises in the illustrated embodiment four knife blades 55, each having a knife edge 56 pointing in the direction of rotation 59. Hereby the knife edges 56 will cooperate with an edge 52 of the opening 57 of the rigid pipe 30.

Hereby the string could be cut into meat pieces.

The knife edge 56 in the rotating knife set 53 is preferably provided as a shredding edge in order to obtain a shredding rather than a clean cutting. Hereby the meat pieces formed would have a more natural appearance.

The invention claimed is:

1. Inline cutting system comprising an extruder having an inlet line, a barrel, and an extruder outlet, wherein a pump is provided on the inlet line for pumping a meat analogue product through the extruder, wherein a rotor is arranged centrally in the barrel, the rotor comprising scraping means in the shape of a helical screw conveyor and the rotor being rotated by means of drive means, the inline cutting system further comprising an outlet line connected with the extruder outlet, wherein the outlet line comprises a side wall surrounding an internal passage and cutting means arranged in connection with the outlet line, wherein said extruder is arranged for continuously producing the meat analogue product and wherein the extruded string of meat analogue product after leaving the extruder is cut into meat pieces by the cutting means, wherein said cutting means is extending through the side wall of the outlet line and extends inside said internal passage, wherein the cutting means comprises at least one cutting edge which is pointed in a substantial axial direction of the outlet line in order to establish a cutting in the longitudinal direction of the string of meat analogue product, wherein the extruder and the outlet line form an enclosure of the cutting means.

2. Inline cutting system according to claim 1, wherein the cutting means comprises at least one cutting edge which is pointed in a direction substantial perpendicular to the outlet line in order to establish a cutting in the transversal direction of the string of meat analogue product.

3. Inline cutting system according to claim 1 wherein the cutting means is arranged in at least one side opening in the side wall which closely surrounds the cutting means.

4. Inline cutting system according to claim 3, wherein the cutting means is connected with drive means for retracting the cutting means from their position in the internal passage and reinserting the cutting means again whereby a scraping effect is obtained when retracting the cutting means.

5. Inline cutting system according to claim 1, wherein the cutting means comprises at least one knife set, wherein each knife comprises a blade and said cutting edge.

6. Inline cutting system according to claim 5, wherein said at least one knife set comprising two, three or more knife blades arranged parallel to each other.

7. Inline cutting system according to claim 1 wherein the cutting means comprises at least two sets of cutting edges, that each set of cutting edges is arranged in a plane substantially perpendicular to the outlet line, wherein said at least two sets of cutting edges are arranged in different positions at the circumference of the outlet line for retraction under different angles.

8. Inline cutting system according to claim 1, wherein the inline cutting system further comprises a rotating knife set, the rotating knife set comprising knife blades, each of the knife blades having a knife edge pointing in the direction of rotation of the rotating knife set in order to establish a cutting in a transversal direction of the string of meat analogue product leaving the outlet line.

9. Inline cutting system according to claim 8, wherein the rotating knife set rotates around an axis perpendicular to the outlet line.

10. Inline cutting system according to claim 8, wherein the knife edge of each of the knife blades cooperates with an edge of an opening of the outlet line which acts as a wearing bar for the cutting edge.

11. Inline cutting system according to claim 8, wherein the knife edge of each of the knife blades is a shredding edge in order to obtain a shredding rather than a clean cutting.

12. Inline cutting system according to claim 1, wherein the outlet line comprises a flexible hose which at one end is connected with the extruder outlet and at the other end is connected with a straight rigid pipe at which the cutting means is provided.

13. Inline cutting system according to claim 1, wherein the cutting system comprises two or more outlet lines each of which is connected with an extruder outlet.

14. Use of the inline cutting system according to claim 1 for cutting meat analogue products into meat pieces by the cutting means in a continuous process, where the cutting means is arranged after an extruder and where the extruder and the outlet line forms a closed enclosure upstream of the cutting means.

* * * * *